United States Patent

[11] 3,621,335

| [72] | Inventor | Donald F. Coleman<br>Dunlap, Ill. |
|---|---|---|
| [21] | Appl. No. | 78,438 |
| [22] | Filed | Oct. 6, 1970 |
| [45] | Patented | Nov. 16, 1971 |
| [73] | Assignee | Caterpillar Tractor Co.<br>Peoria, Ill. |

[54] DRIVER CIRCUIT FOR ENERGIZING AN ELECTRICAL LOAD IN RESPONSE TO SIGNALS FROM A REMOTE SOURCE
6 Claims, 1 Drawing Fig.

| [52] | U.S. Cl. | 317/16,<br>317/33 SC, 317/54, 317/147, 340/163 |
|---|---|---|
| [51] | Int. Cl. | H02h 3/08 |
| [50] | Field of Search | 317/54, 16,<br>33 SC, 147; 325/37; 340/163 |

[56] References Cited
UNITED STATES PATENTS

| 3,217,207 | 11/1965 | Webb | 317/33 SC |
| 3,373,341 | 3/1968 | Wattson | 317/33 SC |
| 3,496,415 | 2/1970 | Ruthenberg et al. | 317/33 SC |
| 3,544,844 | 12/1970 | Pellegrino | 317/33 SC |

*Primary Examiner*—James D. Trammell
*Attorney*—Fryer, Tjensvold, Feix, Phillips & Lempio

ABSTRACT: A solid-state circuit provides for energizing an electrically operated device in response to control signals from a remote source, the circuit being suitable for such purposes as controlling a vehicle through radio signals or through an umbilical cord. The circuit includes means which conducts current form a DC power supply to the electrical device in the presence of the remote signal and which deenergizes the device in the absence of the signal and further includes means which rapidly interrupts the connection between the power supply and electrical device if an overcurrent occurs from a short circuit or other malfunction. The protective means resets upon termination of the remote signals as well as upon interruption of the connection to the power supply so that attempts to reactivate the electrical device may be made through subsequent signals from the remote location.

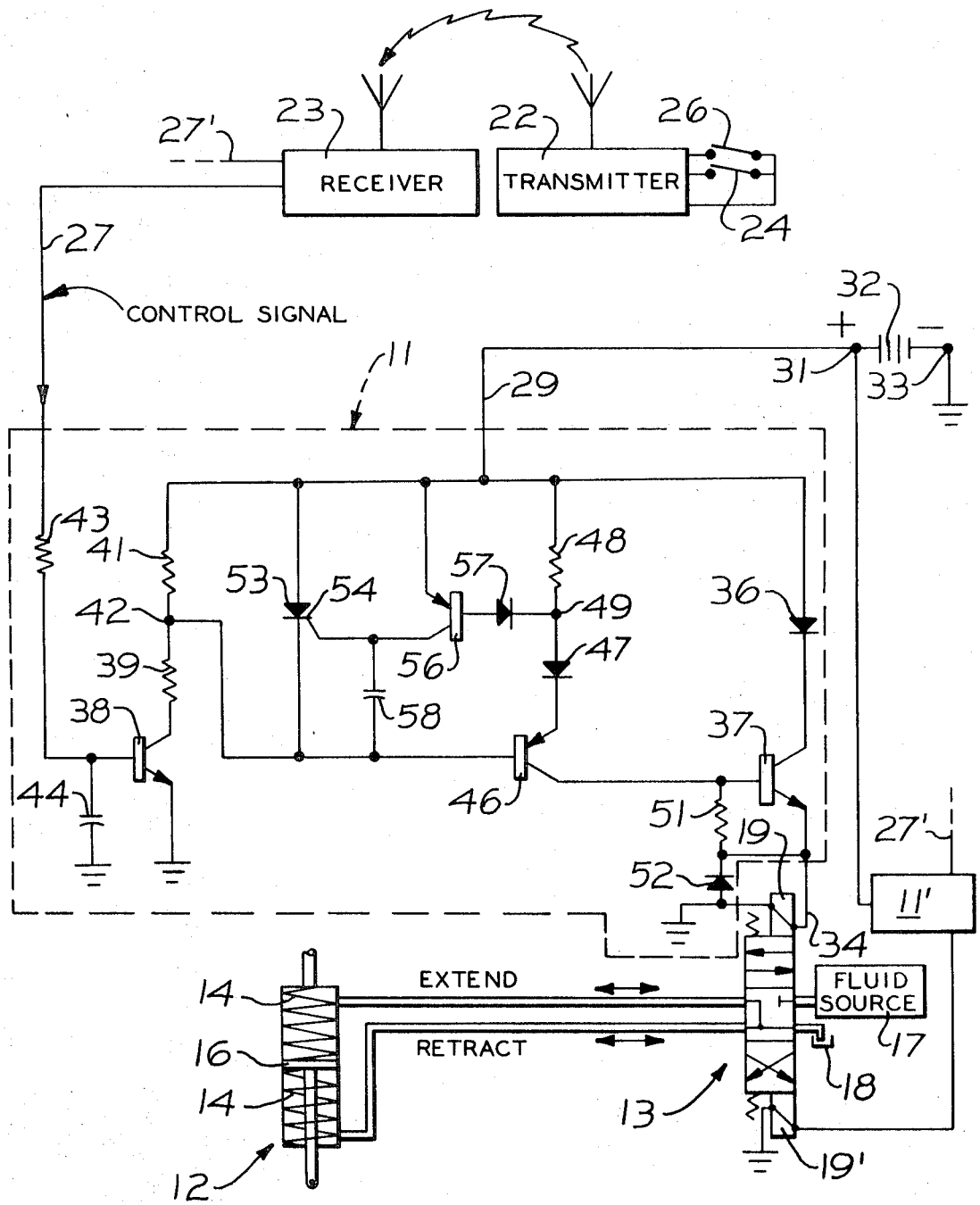

DRIVER CIRCUIT FOR ENERGIZING AN ELECTRICAL LOAD IN RESPONSE TO SIGNALS FROM A REMOTE SOURCE

BACKGROUND OF THE INVENTION

This invention relates to circuits for actuating and deactuating an electrically operated device in response to control signals and more particularly to a circuit of this form having protective means for interrupting current flow to the electrical device in the event of malfunction.

The electrical connection between a power supply and a driven load generally includes some form of switching means which in many circumstances must be controlled through electrical signals received from a remote source. Copending application Ser. No. 822,368 filed May 7, 1969, for REMOTE CONTROL SYSTEM FOR LOAD MANIPULATING VEHICLES and assigned to the assignee of the present application discloses one example of such a system wherein a powered loader of the type used for manipulating earth or other bulk materials is controlled by radio signals so that the vehicle may be used under conditions in which a human operator cannot ride upon the vehicle itself. In the apparatus of the copending application, control linkages which would normally be manipulated by an operator on the vehicle are operated instead by fluid motors controlled by solenoid operated valves with the valve solenoids being energized or deenergized as necessary by circuit means that responds to the radio signals. Many other circumstances require that an electrical device be selectively energized or deenergized in response to received signals.

In conjunction with the primary function of energizing and deenergizing an electrical load in response to signals, it is frequently desirable that a driver circuit of this type also provide protection against excessive current flow which can result from a short circuit, stalling of an electric motor or other malfunction which has the effect of drastically reducing impedance in the power supply circuit. This has been customarily been accomplished through the use of conventional fuses or circuit breakers. Both of these conventional protective devices tend to be undesirably slow acting and the procedures necessary to reset the system may be undesirably complicated. While relatively fast electronic protective circuits are known, these tend to be undesirably complex and are reset only by interrupting the connection to the power supply.

The complications involved in resetting protective devices of the kind discussed above can create very serious problems under certain circumstances such as in the remotely controlled vehicle discussed above. If, for example, the electrical device being remotely controlled is required for such operations as steering, braking or speed control, the triggering of conventional protective circuit interrupting means may lead to severe damage or personnel injury arising from the loss of control of the vehicle.

SUMMARY OF THE INVENTION

This invention provides a simple, inexpensive and highly reliable driver circuit for energizing and deenergizing an electrical load in response to control signals which includes extremely fast acting means for interrupting current to the load in the presence of an incipient overcurrent. The circuit provides a reset action in response to termination of the control signal whereby repeated attempts to reenergize the load may be made in response to subsequent control signals.

Accordingly, it is an object of this invention to provide means for energizing and deenergizing an electrically operated device in response to control signals wherein protection against overcurrents is provided with an automatic resetting action at the termination of each control signal.

The invention together with further objects and advantages thereof will best be understood by reference to the following description of preferred embodiment taken in conjunction with the accompanying drawing.

BRIEF DESCRIPTION OF THE DRAWING

The accompanying drawing is a schematic diagram illustrating an adaptation of the invention to the control of a fluid motor through a solenoid valve which is operated in response to control signals from a remote location.

BRIEF DESCRIPTION OF A PREFERRED EMBODIMENT

Referring now to the drawing, a driver circuit 11 in accordance with the invention is shown as adapted to control the operation of a hydraulic cylinder 12 through a solenoid operated valve 13. Examples of mechanism of this form may be found in the above identified copending application Ser. No. 822,368 wherein hydraulic cylinders such as cylinder 12 replace portions of the linkages between the operator's control levers and the mechanisms controlled therethrough. In this example, cylinder 12 contains two heavy springs 14 which tend to urge the piston 16 to a centered position in the cylinder so that when the vehicle is controlled by an operator thereon, the cylinder 12 functions for practical purposes in the manner of the rigid link which it replaces. When the vehicle is to be operated by remote control, the operator's control lever is fixed in position and thereafter extension of the cylinder 12 by pressurized fluid from a suitable source 17 extends the cylinder to realize one extreme position of the control linkage while contraction of the cylinder establishes the other extreme position and in the absence of pressurized fluid, springs 14 act on piston 16 to effect an intermediate control linkage setting.

The solenoid valve 13 is spring biased to a center position at which fluid source 17 is isolated from the cylinder 12 and both the rod and head ends of the cylinder are communicated with drain 18. Thus, at this position of valve 14, cylinder 12 assumes the intermediate position under the influence of springs 14. Valve 13 may be shifted to a first setting position by energization of a first solenoid 19 at which fluid source 17 is communicated with the rod end of cylinder 12 while the head end of the cylinder is vented to drain 18. Energization of a second solenoid 19' shifts the valve 13 to the other setting at which fluid source 17 is communicated to the head end of the cylinder 12 while the rod end of the cylinder is vented to drain 18. Thus, the cylinder 12 may be caused to extend or retract by energizing the appropriate ones of the solenoid 19 and 19' and may be made to assume the intermediate position by deenergizing both solenoids. Driver circuit 11 controls the first solenoid 19 for this purpose in response to signals from a remote radio transmitter 22. A second driver circuit 11', which may be identical to circuit 11, controls the other solenoid 19' in response to radio signals from the transmitter 22.

Suitable circuits for generating control signals through the radio transmitter 22 and receiver 23 are described in the hereinbefore identified copending application Ser. No. 822,368 and it is important to note that the mode of signal transmission to driver circuit 11 is not limited to radio systems but may variously be an umbilical cord, optical signal transmission system or any of various other means for transmitting control signals over a distance. Whatever signal transmission means is employed, means are provided at the transmitting end such as switches 24 and 26 which may be manually operated to selectively energize solenoids 19 and 19', respectively. Depression of switch 24 causes an electrical signal to be produced on a control signal conductor 27 at receiver 23 while depression of switch 26 causes a signal to be produced on a separate control signal conductor 27'. Control signal conductors 27 and 27' connect with driver circuits 11 and 11', respectively. In practice, in a remotely controlled vehicle, a large number of additional signal channels 27 must be provided to operate the several different vehicle control functions such as engine start and engine stop, steering, transmission shifting, and the like. Only a single channel is described in detail herein inasmuch as the driver circuits 11 for all of the various controls may be essentially similar.

In addition to the control signal input conductor 27, driver circuit 11 has a B+ conductor 29 connected to the positive terminal 31 of a suitable DC power supply 32 which may, for example, be a vehicle battery in the particular example of the invention herein described. The negative terminal 33 of battery 32 is grounded in the present instance. Within driver circuit 11, power conductor 29 is connected to an output conductor 34 to solenoid 19 through a diode 36 and the emitter-collector circuit of a primary transistor 37. The opposite side of solenoid 19 is grounded so that the solenoid is energized if primary transistor 37 is conductive and is deenergized if the primary transistor is nonconductive. Energization of the solenoid 19 is thus dependent on the bias voltage applied to the base of primary transistor 37.

A control signal detector transistor 38 has a grounded emitter and a collector connected to power conductor 29 through a pair of series resistors 39 and 41 having a junction point 42 therebetween. The base of signal detector transistor 38 is coupled to the control signal input conductor 27 and since the control signal from receiver 23 in this particular example has an oscillating waveform, the connection to conductor 27 is made through a resistor 43 and the transistor base is connected to ground through a capacitor 44. Resistor 43 and capacitor 44 thus define an RC network which integrates the oscillating control signal to apply a voltage to the base of transistor 38 which biases the transistor into conduction during receipt of a control signal. Thus, signal detector transistor 38 conducts as long as switch 24 at transmitter 22 is depressed and is turned off when switch 24 is opened.

Conduction through signal detector transistor 38 in response to a control signal causes a voltage drop at junction 42 which is connected to the base of a driver transistor 46. The emitter-collector circuit of driver transistor 46 connects the base of primary transistor 37 with the power conductor 29 through a diode 47 and resistor 48 having a junction point 49 therebetween. The base of primary transistor 37 is connected to driver circuit output conductor 34 through an additional resistor 51. Accordingly, the voltage drop at junction 42 produced by receipt of a control signal biases driver transistor 46 into conduction and the driver transistor in turn applies voltage to the base of the primary transistor 37 thereby energizing the solenoid 19 to cause retraction of hydraulic cylinder 12 as previously described. A diode 52 connected across the terminals of solenoid 19 protects the solenoid against transient inverted voltage spikes.

The circuit means described above accomplishes the primary function of energizing the electrical load defined by solenoid 19 in response to a control signal on input conductor 27 and also acts to deenergize the solenoid when the control signal terminates inasmuch as signal detector transistor 38 becomes nonconductive in the absence of the control signal. This causes a voltage rise at the base of the driver transistor 46 which becomes nonconductive in turn and thereby removes base voltage from primary transistor 37 which also becomes nonconductive as a result.

Considering now the means provided for protection against overcurrents, an SCR (Silicon-controlled rectifier) 53 having a control terminal 54 is connected between power conductor 29 and the base of driver transistor 46. Thus, conduction through SCR 53 will apply supply voltage to the base of driver transistor 46 cutting off conduction therethrough and removing the base voltage from primary transistor 37 to open the circuit from power conductor 29 to solenoid 19. SCR 53 may be made conductive for this purpose by applying supply voltage to the control electrode 54.

To sense an incipient overcurrent and to trigger the SCR 53 into conduction in the presence of such a condition, the control electrode 54 of the SCR is connected to power conductor 29 through the emitter-collector circuit of an overcurrent sensing transistor 56. The base of transistor 56 is coupled to the previously described junction point 49 through a diode 57. As the load current through solenoid 19 increases, the base current to primary transistor 37 also increases causing the voltage at junction 49 to drop. At a particular current level determined by the resistive values of resistor 48 and diode 57 and the intrinsic base to emitter voltage relationship of transistor 56, the transistor 56 becomes conductive and triggers SCR 53 into conduction. This action, which is extremely rapid, turns off driver transistor 46 as previously described, thereby turning off the primary transistor 37 and stopping current flow to solenoid 19.

When the driver transistor 46 shuts off in response to an incipient overcurrent as described above, the current through resistor 48 drops abruptly and the overcurrent sensing transistor 56 also shuts off. However, SCR 53 remains conductive at that time through signal detector transistor 38 as long as the existing control signal at input 27 conductor is continued. Conduction through the SCR 53 is stopped, to reset the circuit, then the control signal on input 27 is terminated by opening of switch 24 at transmitter 22.

Reenergization of the solenoid 19 may then be attempted by manually closing switch 24 at transmitter 22 to initiate a subsequent control signal at input 27. If the short circuit at solenoid 19 or other malfunction responsible for the overcurrent is no longer present, the subsequent signal will initiate conduction through primary transistor 37 as previously described to energize the solenoid. If the fault remains uncorrected, the shutdown function is immediately initiated. Thus, fast reliable protection against overcurrents is provided while repeated attempts to reenergize the load may be made from the remote location.

To compensate for variations in SCR 53 sensitivity, a capacitor 58 is connected between the control terminal 54 of the SCR and the base of driver transistor 46. This avoids any need for very precise matching of large numbers of circuit components to realize the shutdown function at a predetermined current level. With this arrangement, only resistor 48 and diode 57 need to be selected to have very precise resistive values.

What is claimed is:

1. In a circuit for selectively coupling an electrical power supply (32) to an electrical load (19) in response to a control signal, the combination comprising:
    a primary switching device (37) connected between said power supply and said load and having an open condition and a closed condition as determined by a control voltage applied to said primary switching device,
    an electrical resistance (41) having one end coupled to said power supply and having a circuit junction (42) at the opposite end,
    a signal detecting switching device (38) connected across said power supply through said circuit junction and electrical resistance and having means (27) for receiving said control signal, said signal detecting switching device being switchable between a conducting and nonconducting condition in response to said control signal whereby the voltage at said junction is changed while said control signal is present,
    circuit means (46) connected between said junction and said primary switching device for changing said control voltage applied thereto in response to said voltage change at said junction produced by said control signal,
    switch means (53) connected between said junction and said power supply in parallel relationship with said resistance, said switch means being of the form which becomes conductive only when a control voltage is applied thereto and remains conductive until the current flow therethrough is interrupted, and
    an overcurrent-sensing switching device (56) connected between said power supply and said switch means for applying said control voltage thereto in response to a predetermined degree of current increase at said primary switching device.

2. In a circuit as defined in claim 1, a second electrical resistance (48) connected between said power supply and said circuit means and wherein said circuit means derives said control voltage applied to said primary switching device through said second resistance, and wherein said overcurrent sensing switching device applies said control voltage to said switch means in response to a predetermined change of voltage drop across said second resistance.

3. A circuit for selectively coupling an electrical load (19) to a DC power supply (32) in response to a control signal, comprising a primary transistor (37) having an emitter-collector circuit connected between said power supply and said load and having a base, a first resistor (41), a signal detector transistor (38) having an emitter-collector circuit connected across said power supply through said first resistor, and having a base, means (27) for applying said control signal to said base of said signal detector transistor, a second resistor (48)

a driver transistor (46) having an emitter-collector circuit connecting said base of said primary transistor with said power supply through said second resistor and having a base connected to said power supply through said first resistor whereby said driver transistor is biased to conductive state by the voltage change across said first resistor when said signal detector transistor becomes conductive upon receipt of said control signal, said conduction through said driver transistor biasing said primary transistor into conduction to energize said load, an SCR (53) connected between said power supply and said base of said driver transistor and having a control terminal, and an overcurrent-sensing transistor (56) having an emitter-collector circuit connected between said power supply and said control terminal of said SCR and having a base coupled to said power supply through said second resistor whereby said overcurrent-sensing transistor is biased into conduction by the voltage change across said second resistor produced by a predetermined decrease of impedance in said load, said conduction through said overcurrent-sensing resistor acting to trigger said SCR into conduction.

4. The combination defined in claim 3 wherein said means for applying said control signal to the base of said signal detecting transistor comprises a signal input conductor (27) coupled to said transistor base through a resistance capacitance network (43,44) for integrating an oscillating wave form to apply a relatively constant voltage to said transistor base during the duration of said control signal.

5. The combination defined in claim 3 further comprising a capacitor (58) connected between said control terminal of said SCR and said base of said driver transistor.

6. The combination defined in claim 3 further comprising a diode (57) connected between said base of said overcurrent-sensing transistor and said second resistor.